United States Patent
Morgan et al.

(10) Patent No.: US 10,724,478 B2
(45) Date of Patent: Jul. 28, 2020

(54) INSULATION MATERIALS COMPRISING FIBERS HAVING A PARTIALLY CURED POLYMER COATING THEREON, STRUCTURES INCLUDING SUCH INSULATION MATERIALS, AND METHODS OF INSULATING SUCH STRUCTURES

(71) Applicant: Northrop Grumman Innovation Systems, Inc., Plymouth, MN (US)

(72) Inventors: Richard E. Morgan, Huntsville, AL (US); Craig L. Meeks, Meridianville, AL (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 480 days.

(21) Appl. No.: 15/366,518

(22) Filed: Dec. 1, 2016

(65) Prior Publication Data
US 2017/0328308 A1 Nov. 16, 2017

Related U.S. Application Data

(63) Continuation of application No. 13/787,355, filed on Mar. 6, 2013, now Pat. No. 9,587,586.

(51) Int. Cl.
*F02K 1/82* (2006.01)
*F02K 9/32* (2006.01)
(Continued)

(52) U.S. Cl.
CPC .............. *F02K 1/822* (2013.01); *C04B 35/00* (2013.01); *C04B 35/6269* (2013.01);
(Continued)

(58) Field of Classification Search
USPC .................................. 428/36.1, 221; 442/136
See application file for complete search history.

(56) References Cited

U.S. PATENT DOCUMENTS

| 3,459,701 A | 8/1969 | Chandler, Jr. et al. |
| 3,472,812 A | 10/1969 | Byrne et al. |

(Continued)

FOREIGN PATENT DOCUMENTS

GB 1044765 10/1966

OTHER PUBLICATIONS

Morgan, et al., Non-Asbestos Insulation Testing Using a Plasma Torch, American Institute of Aeronautics and Astronautics, 2000, 7 pages.

(Continued)

*Primary Examiner* — Lynda Salvatore
(74) *Attorney, Agent, or Firm* — TraskBritt

(57) ABSTRACT

Insulation materials have a coating of a partially cured polymer on a plurality of fibers, and the plurality of coated fibers in a cross-linked polymeric matrix. Insulation may be formed by applying a preceramic polymer to a plurality of fibers, heating the preceramic polymer to form a partially cured polymer over at least portions of the plurality of fibers, disposing the plurality of fibers in a polymeric material, and curing the polymeric material. A rocket motor may be formed by disposing a plurality of coated fibers in an insulation precursor, curing the insulation precursor to form an insulation material without sintering the partially cured polymer, and providing an energetic material over the polymeric material. An article includes an insulation material over at least one surface.

22 Claims, 4 Drawing Sheets

(51) Int. Cl.

| | | |
|---|---|---|
| *H01B 3/30* | (2006.01) | |
| *C04B 35/628* | (2006.01) | |
| *C04B 35/626* | (2006.01) | |
| *C04B 35/83* | (2006.01) | |
| *F02K 9/00* | (2006.01) | |
| *C04B 35/00* | (2006.01) | |
| *C08K 3/36* | (2006.01) | |

(52) U.S. Cl.
CPC .. *C04B 35/62863* (2013.01); *C04B 35/62871* (2013.01); *C04B 35/83* (2013.01); *C08K 3/36* (2013.01); *F02K 9/00* (2013.01); *F02K 9/32* (2013.01); *H01B 3/308* (2013.01); *C04B 2235/483* (2013.01); *C04B 2235/5212* (2013.01); *C04B 2235/5248* (2013.01); *F05D 2300/6033* (2013.01); *Y10T 428/1362* (2015.01); *Y10T 428/249921* (2015.04); *Y10T 442/2631* (2015.04)

(56) References Cited

U.S. PATENT DOCUMENTS

| | | |
|---|---|---|
| 3,505,100 A | 4/1970 | Clayton |
| 3,506,607 A | 4/1970 | Bobear et al. |
| 3,623,904 A | 11/1971 | Ramseyer |
| 4,501,841 A | 2/1985 | Herring |
| 4,507,165 A | 3/1985 | Herring |
| 4,581,391 A | 4/1986 | Baldwin et al. |
| 4,878,431 A | 11/1989 | Herring |
| 5,024,860 A | 6/1991 | Chang |
| 5,038,561 A | 8/1991 | Chase |
| 5,212,944 A | 5/1993 | Martin et al. |
| 5,399,599 A | 3/1995 | Guillot |
| 5,451,637 A | 9/1995 | Leibfried |
| 5,703,178 A | 12/1997 | Gasmena |
| 6,554,936 B1 | 4/2003 | Metcalf et al. |
| 6,606,852 B1 | 8/2003 | Harvey et al. |
| 6,691,505 B2 | 2/2004 | Harvey et al. |
| 6,890,635 B2 | 5/2005 | Lin et al. |
| 7,461,503 B2 | 12/2008 | Gajiwala |
| 7,714,092 B2 | 5/2010 | Shen |
| 7,767,746 B2 | 8/2010 | Gajiwala |
| 7,820,285 B1 | 10/2010 | Pittman, Jr. et al. |
| 9,587,586 B2 * | 3/2017 | Morgan .............. C08K 3/36 |
| 2010/0304152 A1 | 12/2010 | Clarke |
| 2012/0034428 A1 | 2/2012 | Clarke |
| 2013/0122763 A1 | 5/2013 | Fish |
| 2014/0255635 A1 | 9/2014 | Morgan |

OTHER PUBLICATIONS

Star PC* SMP-10, Silicon Carbide Matrix Precursor, Starfire Systems.

* cited by examiner

INSULATION MATERIALS COMPRISING FIBERS HAVING A PARTIALLY CURED POLYMER COATING THEREON, STRUCTURES INCLUDING SUCH INSULATION MATERIALS, AND METHODS OF INSULATING SUCH STRUCTURES

CROSS-REFERENCE TO RELATED APPLICATION

This application is a continuation of U.S. patent application Ser. No. 13/787,355, filed Mar. 6, 2013, now U.S. Pat. No. 9,587,586 issued Mar. 7, 2017, the disclosure of which is hereby incorporated herein in its entirety by this reference.

GOVERNMENT LICENSE RIGHTS

This invention was made with government support under Contract No. NNM11AA01B, Task Order NNM12AA33T, awarded by NASA, and Contract No. ABL W31P4Q-08-D-0026, awarded by the Army. The government has certain rights in the invention.

TECHNICAL FIELD

Embodiments of the present disclosure relate to insulation materials, articles including the insulation materials, and methods of forming the insulation materials and articles. Insulation materials of embodiments of the present disclosure exhibit increased thermal resistivity compared to conventional insulation.

BACKGROUND

Solid rocket motors include energetic and non-energetic materials. Improving the performance of a solid rocket motor typically requires increasing the performance of the energetic material, increasing the mass of energetic material, decreasing the mass of the non-energetic material, or some combination of these modifications. Because solid rocket motors are volume-limited systems, reducing the volume of non-energetic materials in the solid rocket motor allows for an increase in the volume and mass of energetic materials.

The non-energetic materials in a rocket motor may include, for example, a casing, insulation material, liner materials formulated to promote bonding, and nozzle materials. Reducing the volume of the insulation material may leave a relatively larger volume within the rocket motor, but may also leave the casing with insufficient thermal protection. Thus, in the design of rocket motors, performance and thermal protection are considered together in attempting to develop an optimized system within known parameters.

Rocket motor casings are generally made of metal, a composite material, or a combination of metal and composite materials. During operation, insulation protects the rocket motor casing from thermal effects and erosive effects of particle streams generated by combustion of a propellant. Typically, the insulation is bonded to the interior surface of the casing and is fabricated from a composition that, upon curing, is capable of enduring the high temperature gases and erosive particles produced while the propellant burns. A liner bonds the propellant to the insulation and to any noninsulated interior surface portions of the casing. Liners also typically have an ablative function, inhibiting burning of the insulation at liner-to-insulation interfaces.

The combustion of a solid rocket propellant generates extreme conditions within the rocket motor casing. For example, temperatures inside the rocket motor casing can reach 2,760° C. (5,000° F.). These conditions, in combination with the restrictive throat region of the nozzle passageway, create a high degree of turbulence of high-temperature combustion gases within the rocket motor casing and nozzle. In addition, gases produced during propellant combustion typically contain high-energy particles that, under a turbulent environment such as encountered in a rocket motor, can erode the rocket motor insulation. If gases produced by the burning propellant penetrate the insulation and liner, the casing may melt or otherwise be compromised, causing the rocket motor to fail. Thus, the insulation is formulated to withstand the extreme conditions experienced during propellant combustion and protect the casing from the burning propellant.

Some conventional rocket motor insulations include filled and unfilled plastics or polymers, such as phenolic resins, epoxy resins, high temperature melamine-formaldehyde coatings, as well as ceramics, polyester resins, and the like. Plastics, however, tend to crack or blister in response to the rapid heat and pressure fluctuations experienced during rocket motor propellant combustion.

Rubbers and elastomers have also been used as rocket motor insulation. Cured ethylene-propylene-diene monomer ("EPDM") terpolymer may be used alone or in a blend, and is often selected because of its favorable mechanical, thermal, and ablative properties. However, in high-velocity environments, the ablative properties of elastomers are sometimes inadequate for rocket motor operation unless the elastomers are reinforced with suitable fillers, such as carbon fibers or silica fibers. The criticality of avoiding high erosion rates is demonstrated by the severity and magnitude of risk of failure due to erosion. Most insulation is, of necessity, "man-rated" in the sense that a catastrophic failure can result in the loss of human life. Additionally, the tensile strength and tear strength of unfilled elastomers may not be sufficiently high to withstand and endure the mechanical stresses that the elastomer is subjected to during processing.

Incorporation of fibers can increase the ablation resistance of an insulation material. However, many fibers are friable, and degrade during the preparation of the insulation material.

It would be advantageous to provide a thermal protection system that occupies less volume than conventional insulation materials. Such thermal protection may make it possible to increase the volume loading of energetic material in a rocket motor, increasing the performance of the motor. Such thermal protection may also be useful to make advanced propellant formulations feasible (e.g., propellants that burn hotter than conventional propellants).

BRIEF SUMMARY

Some embodiments of the present disclosure include insulation materials having a plurality of fibers with a partially cured polymer coating thereon and disposed in a cross-linked polymeric matrix.

Some methods of forming insulation materials include applying a preceramic polymer to a plurality of fibers, heating the preceramic polymer to form a partially cured polymer over at least portions of the plurality of fibers, disposing the plurality of fibers in a polymeric material, and curing the polymeric material.

A method of forming a rocket motor includes coating a plurality of fibers with a partially cured polymer formulated to form a ceramic upon exposure to a temperature of at least 850° C., disposing the plurality of coated fibers in an insulation precursor, curing the insulation precursor to form a polymeric material without sintering the partially cured polymer, and providing an energetic material over the polymeric material.

In some embodiments, an article includes an insulation material over at least one surface. The insulation material includes a plurality of fibers coated with a partially cured polymer, the plurality of coated fibers dispersed in a cross-linked polymeric matrix.

BRIEF DESCRIPTION OF THE DRAWINGS

While the specification concludes with claims particularly pointing out and distinctly claiming that which is regarded as the invention, advantages of the present disclosure may be more readily ascertained from the following detailed description when read in conjunction with the accompanying drawings in which:

DETAILED DESCRIPTION

Figure 1:
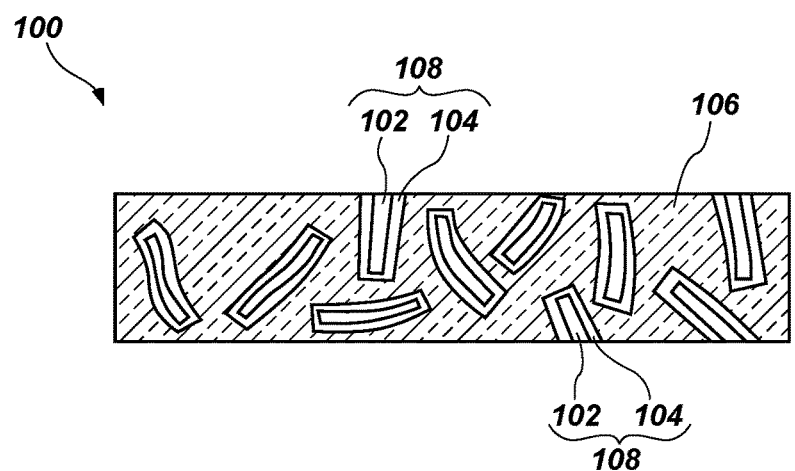
FIG. 1 shows a simplified schematic cross-section of an insulation material according to an embodiment of the present disclosure.

Insulation materials, insulated articles, methods of forming insulation materials and insulated articles, and methods of firing rocket motors having the insulation materials are described. In one embodiment, an insulation material includes fibers coated with a partially cured polymer. The coated fibers are in a cross-linked polymeric matrix. The cross-linked polymeric matrix may be a conventional insulation material. When the insulation material is exposed to high temperatures, such as those that occur during a rocket-motor firing, the partially cured polymer forms a ceramic on the insulation material that increases the insulative properties of the insulation. The insulation material of embodiments of the present disclosure may provide increased thermal protection to an article containing the insulation material.

As used herein, the term "partially cured polymer" means and includes a crosslinked polymeric compound produced from a polymeric precursor of a ceramic (a preceramic polymer). The partially cured polymer is formed by partially curing the preceramic polymer at a temperature sufficient to promote crosslinking among carbons of the preceramic polymer but not sufficient to ceramify the preceramic polymer. The process of forming the partially cured polymer may be referred to in the art as "staging," "partially curing," "polymerizing," or "green-curing." Thus, the partially cured polymer is a material that has not been sintered to form ceramic.

The insulation material may include a cross-linked polymeric material. The cross-linked polymeric material may be a cured solid, and may include polymers used to form conventional insulation materials. For example, the cross-linked polymeric material may be polyisoprene, EPDM terpolymer, nitrile butadiene rubber (NBR), hydroxyl-terminated polybutadiene (HTPB) rubber, etc. The cross-linked polymeric material may also include a filler dispersed therein, such as silica, clay, carbon black, asbestos, or polyvinyl chloride. Depending on the desired properties, the insulation material may optionally include other components, such as antioxidants, cure accelerators, cure activators, tackifiers, and/or plasticizers. Such components are known in the art and, therefore, are not described in detail herein.

The insulation material also includes a plurality of fibers within a matrix of the cross-linked polymeric material. The fibers are coated with the partially cured polymer. Fibers may be in bulk form (independent of one another) or in sheets of material (e.g., woven fabric). The fibers may be, for example, aramid fibers (e.g., KEVLAR® brand fibers, available from E. I. du Pont de Nemours and Company, of Wilmington, Del.), carbon fibers, etc. The coated fibers may be within the continuous solid matrix of cross-linked polymeric material.

The partially cured polymer on the fibers may be a material formulated to form a ceramic upon exposure to a relatively high temperature. For example, the partially cured polymer may form a ceramic, such as silicon carbide, silicon nitrocarbide, or silicon oxycarbide, at a temperature above about 850° C., above about 1000° C., or even above about 1200° C. In its partially cured state, the partially cured polymer may have a rubberlike consistency. Thus, the coating of the partially cured polymer on the fibers may be flexible until the partially cured polymer is ceramified. Due to the high sintering temperature of the preceramic polymer, the partially cured polymer may remain less than fully cured during and after the continuous solid matrix is formed and cured. For example, in some embodiments, the continuous solid matrix may be formed by curing the cross-linked polymeric material at a temperature of about 200° C. or lower, well below a sintering temperature of the partially cured polymer. The partially cured polymer may include a silicon-based, preceramic polymer, such as an organosilicon polymer that produces a silicon carbide, silicon nitrocarbide, or silicon oxycarbide when ceramified. For example, the partially cured polymer may be a polycarbosilane, a polysilazane, a polysiloxane, or combinations thereof. The partially cured polymer may be formed by a low-temperature cure (e.g., a cure at a temperature from about 180° C. to about 400° C.) of the preceramic polymer. The preceramic polymer may be a liquid at a temperature at which the preceramic polymer is applied to the fibers. For example, the preceramic polymer may be a one-component liquid precursor to silicon carbide, such as STARPCS® SMP-10, available from Starfire Systems, of Schenectady, N.Y. Some preceramic polymers are described in U.S. Pat. No. 7,714,092, issued May 11, 2010, and titled "Composition, Preparation of Polycarbosilanes and Their Uses." The coating of the partially cured polymer may have a mean thickness over the fibers of less than the mean diameter of the fibers. For example, the fibers may have a mean diameter from about 0.01 mm to about 1 mm. In such embodiments, the coating of the partially cured polymer may have a mean thickness from about 0.001 mm to about 0.2 mm. Thus, the coating of the partially cured polymer may account for a small percentage of a total weight of the insulation material.

FIG. 1 shows a simplified illustration of an insulation material 100. The insulation material 100 has a plurality of fibers 102 coated with a partially cured polymer 104. Coated fibers 108 are in a cross-linked polymeric matrix 106.

The insulation material 100 may be formed by coating fibers 102 with the preceramic polymer (a first polymeric material), then heating the fibers 102 and the preceramic polymer to a temperature sufficient to partially cure or green-cure the preceramic polymer to form the partially cured polymer 104. The preceramic polymer may be applied to the fibers 102 by conventional techniques, which are not described in detail herein. The coated fibers 108 may include a substantially continuous coating of the partially cured polymer 104 over the fibers 102 or may include a discontinuous coating of the partially cured polymer 104 over the fibers 102. In some embodiments, the fibers 102 and the preceramic polymer may be maintained at a temperature from about 100° C. to about 300° C., at atmospheric pressure, and less than about 10% relative humidity for a time period sufficient to polymerize the preceramic polymer. For example, the fibers 102 and the preceramic polymer may be maintained at a temperature of at least about 150° C. for a time period from about 30 minutes to about 60 minutes. The degree of curing of the preceramic polymer may be a function of the cure conditions (e.g., temperature, humidity, pressure, etc.) and the cure time. The coated fibers 108 may then be mixed with or coated with a precursor of the cross-linked polymeric matrix 106, which may be a second polymeric material or a monomeric material. For example, the coated fibers 108 may be mixed with a precursor used to form polyisoprene, EPDM terpolymer, NBR, HTPB rubber, etc. In some embodiments, a sheet or cloth formed of the fibers 102 may be coated with the partially cured polymer 104, then coated with a precursor of the cross-linked polymeric matrix 106. The coated fibers 108 and the precursor may be heated to a temperature sufficient to cure the precursor to form the cross-linked polymeric matrix 106. The cure temperature may be selected such that the precursor cures without further curing, sintering, decomposing, or otherwise modifying the chemical structure of the partially cured polymer 104. In some embodiments, the precursor may be maintained at a temperature from about 100° C. to about 300° C. in a press for a time period sufficient to cross-link or polymerize the precursor. For example, the coated fibers 108 and the precursor may be maintained at a temperature of about 150° C. for a time period from about 30 minutes to about 60 minutes to form the cross-linked polymeric matrix 106. A cure catalyst may be added to the precursor to promote the curing thereof. The concentration of the cure catalyst may be tailored to effect formation of a material with selected physical properties (e.g., hardness, strength, ductility, etc.). The precursor may be cured in an oven maintained at approximately constant temperature, pressure, and/or humidity.

The insulation material 100 may be applied to a surface (e.g., a surface of a rocket motor, a nozzle, or another body) after the insulation material 100 is formed or the insulation material 100 may be applied to a surface in-situ. For example, the insulation material 100 may be formed into sheets, and the sheets may be bonded to a surface, or may be strip-wrapped over a surface. In some embodiments, insulation precursors (e.g., a precursor to the cross-linked polymeric matrix 106 with coated fibers 108 dispersed therein) may be applied to a surface, such as by spin-coating, spreading, etc., and the insulation precursors may be cured to form the insulation material 100.

Figure 2:
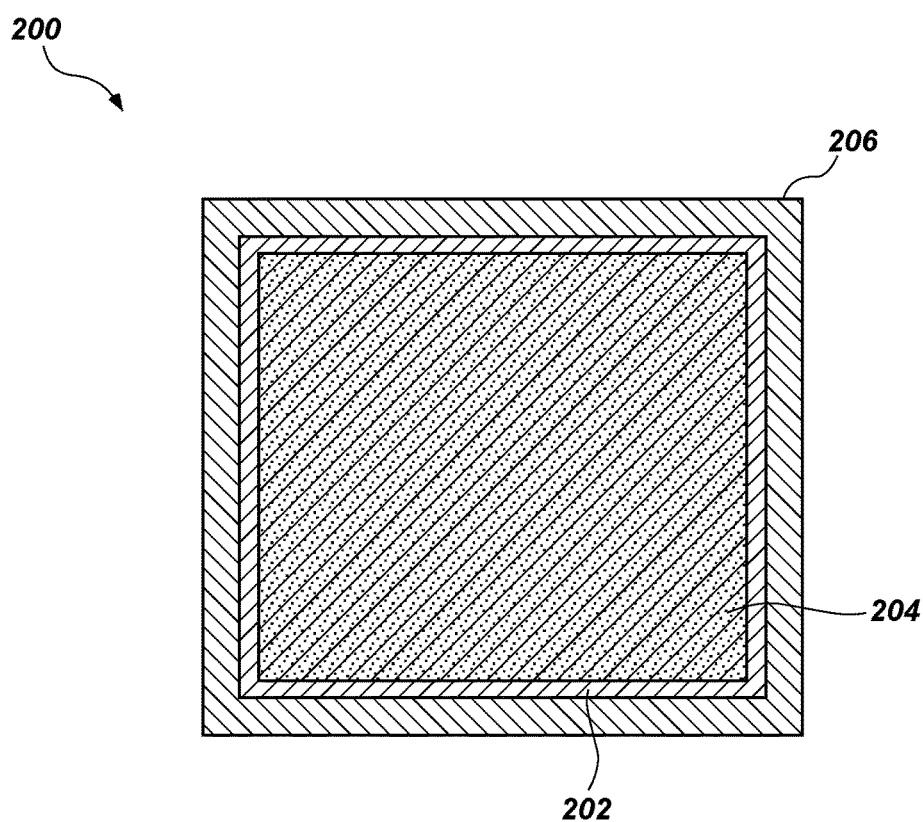
FIG. 2 shows a simplified cross-section of an article including an insulation material according to an embodiment of the present disclosure.

As shown in FIG. 2, an article 200 may include an insulation material 202 (e.g., the insulation material 100 shown in FIG. 1) and an energetic composition 204 (e.g., a propellant composition, a gas generator composition, a smokeless gun powder composition, a munitions composition, an explosive composition, etc.). The insulation material 202 and the energetic composition 204 may be contained within a housing 206 of the article 200. By way of example, the article 200 may include a gas generating device, such as an airbag device or a fire suppression device, ordnance, munitions, or a rocket motor. The article 200 may also include, but is not limited to, cartridges for small arms ammunition (e.g., rimfire cartridges, center fire cartridges, shot shells, rifled slugs, etc.), grenades, mines, mortar fuses, detcord initiators, illuminating flares, or signaling flares.

Figure 3:
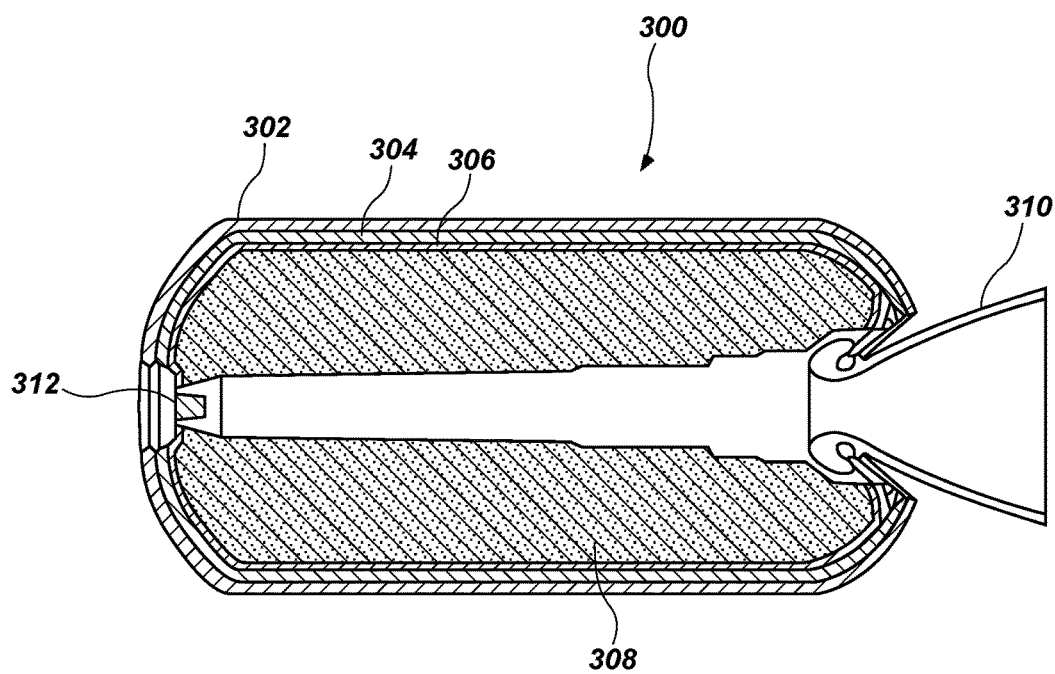
FIG. 3 shows a simplified cross-section of a rocket motor including an insulation material according to an embodiment of the present disclosure.

As shown in FIG. 3, a rocket motor 300 may include insulation materials according to embodiments of the present disclosure. For example, a rocket motor 300 may include a casing 302, an insulation material 304 (e.g., the insulation material 100 shown in FIG. 1), a liner 306, and an energetic material 308 (e.g., a solid propellant such as a double-base propellant, an HTPB-based propellant, etc.). The insulation material 304 may include the fibers coated with the partially cured polymer in the cured polymeric matrix. The rocket motor 300 may also include a nozzle assembly 310, an igniter 312, etc.

The rocket motor 300 may be formed by securing the insulation material 304 within the casing 302 by conventional techniques. For example, the insulation material 304 may be formed within the casing 302 or may be formed as one or more sheets, which are subsequently bonded to the casing 302. The insulation material 304 may be formed as described above with respect to the insulation material 100 of FIG. 1. The liner 306 is provided over at least a portion of the insulation material 304 and the casing 302. The energetic material 308 is provided (e.g., cast) into the casing 302 over the liner 306.

Figure 4:
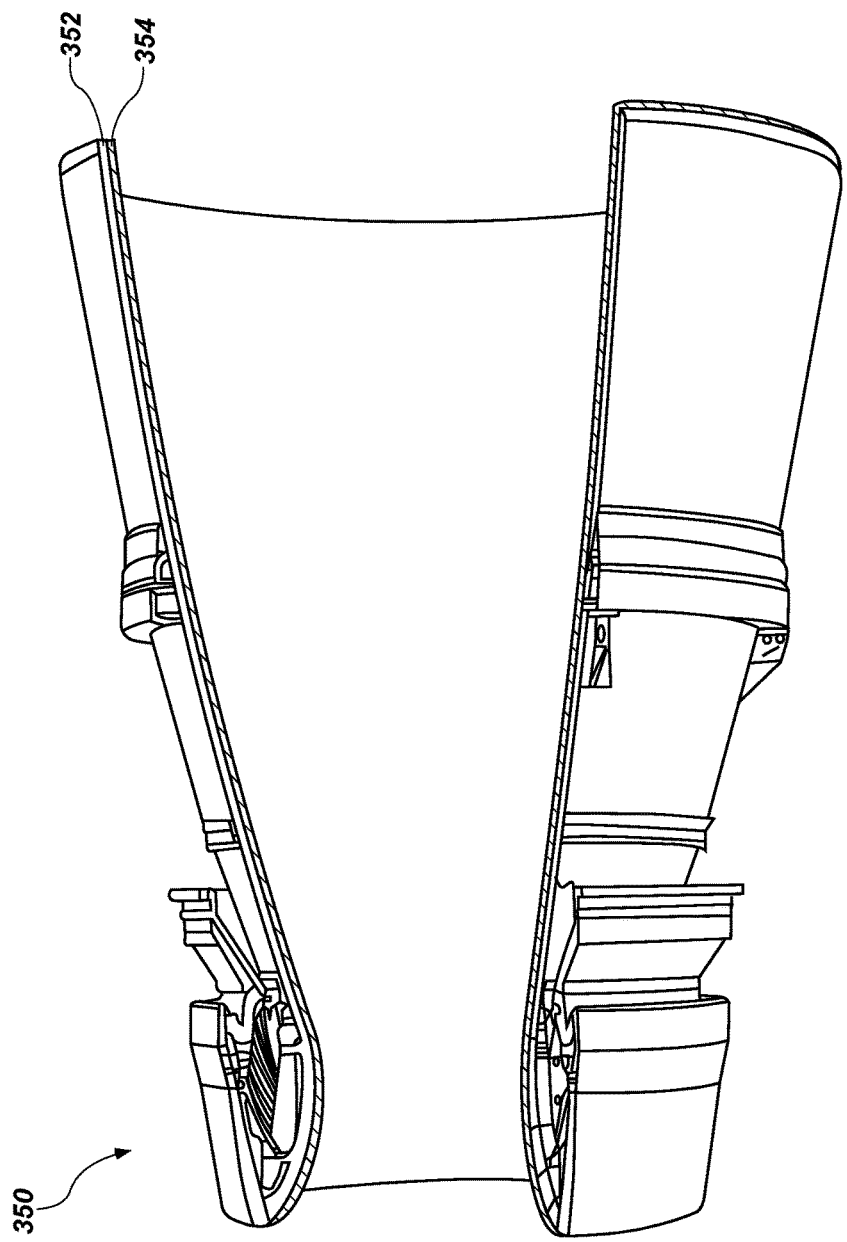
FIG. 4 shows a simplified cutaway view of a rocket motor nozzle including an insulation material according to an embodiment of the present disclosure.

As shown in FIG. 4, a nozzle 350 may include insulation materials according to embodiments of the present disclosure. For example, a nozzle 350 may include an outer wall 352 and an insulation material 354 (e.g., the insulation material 100 shown in FIG. 1). The outer wall 352 may include a material formulated to provide a physical structure over which the insulation material 354 is formed. For example, the outer wall 352 may include a metal or a composite material. The insulation material 354 may include the fibers coated with the partially cured polymer in the cured polymeric matrix. For example, the insulation material 354 may include a sheet or fabric of the fibers coated with the partially cured polymer, and over which the polymeric matrix (e.g., a phenolic resin) is formed and cured.

Figure 5:
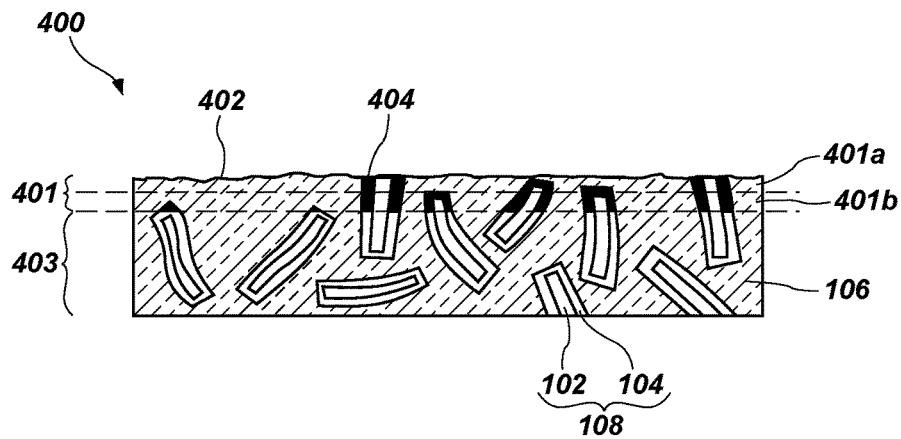
FIG. 5 shows a simplified schematic cross-section of the insulation material of FIG. 1 after exposure to a temperature of greater than about 850° C.

The insulation materials 100, 202, 304, 354 disclosed herein and shown in FIGS. 1 through 4 may exhibit improved insulative properties when exposed to temperatures sufficient to cause the partially cured polymer 104 (FIG. 1) to form a ceramic. For example, when one side of the insulation material 100 is exposed to a temperature sufficient to modify the chemical structure of the partially cured polymer 104, a ceramic may form. FIG. 5 illustrates an insulation material 400 that has been subjected to a high temperature (e.g., greater than about 850° C.) along a surface 402 of the insulation material 400. The insulation material 400 has the fibers 102 coated with the partially cured polymer 104 in the cross-linked polymeric matrix 106, as shown in FIG. 1 and described above. Following exposure to the high temperature, the insulation material 400 forms two regions: a heat-affected region 401 and a virgin material region 403. The heat-affected region 401 may include two sub-regions: an ablated region 401a and a char region 401b. The ablated region 401a may include ash that is easily removed from the insulation material 400. The char region 401b may include a crust of material that is adhered to the virgin material region 403. A portion of the cross-linked polymeric matrix 106 in the ablated region 401a may be removed during exposure to the high temperature. Furthermore, a portion of the partially cured polymer 104 in the heat-affected region 401 reacts or fuses to form a ceramic 404 over or around the fibers 102. The ceramic 404 provides additional insulative properties to the insulation material 400.

Since the partially cured polymer 104 includes a silicon-based preceramic polymer, the ceramic 404 formed during exposure of the insulation material 400 to a high temperature may be an inorganic ceramic, such as a glass material. In some embodiments, the ceramic 404 may include silicon dioxide, silicon carbide, or a combination thereof. The ceramic 404 may be substantially free of carbon. In some embodiments, the ceramic 404 may include some carbon, but inorganic materials of the ceramic 404 may form a sintered matrix. The ceramic 404 may be tenacious in that it remains adhered to the insulation material 400 during use and operation of an article, such as the article 200 (FIG. 2), the rocket motor 300 (FIG. 3), or the nozzle 350 (FIG. 4). Without being bound to any particular theory, the ceramic 404 may form by sintering of the partially cured polymer 104 to remove carbon from the solid structure. For example, the carbon of the partially cured polymer 104 (see FIG. 1) may be removed in the form of low-molecular-weight organic materials and combustion products of carbon (e.g., carbon dioxide). Gases, such as hydrogen, nitrogen, carbon dioxide, or carbon monoxide, may form and diffuse away from the surface 402. The reaction of the partially cured polymer 104 may leave a portion of inorganic material (e.g., a layer of inorganic material) over a portion of the fibers 102 or the cross-linked polymeric matrix 106. The ceramic 404 may adhere or cling to the fibers 102 or the cross-linked polymeric matrix 106, such that the ceramic 404 remains at the surface 402 of the insulation material 400 and provides resistance to heat transfer through the insulation material 400. The ceramic 404 may remain on the surface 402 of the insulation material 400 when exposed to gas turbulence.

The ceramic 404 may have a higher thermal reflectivity (defined as the radiation reflected by a surface divided by the radiation received by a surface) than the cross-linked polymeric matrix 106 or the partially cured polymer 104. Thus, upon formation of the ceramic 404, which is a glassy material, the insulation material 400 may reflect more thermal energy than the insulation material 100 (FIG. 1) lacking the ceramic 404. Thus, the ceramic 404 may improve the ability of the insulation material 400 to protect surfaces from extreme temperatures.

Returning to FIG. 3, the rocket motor 300 may be used to propel a vehicle (e.g., a rocket). The igniter 312 may be activated to ignite the energetic material 308 within the casing 302. The burning energetic material 308 may heat the interior of the casing 302, including the energetic material 308, the liner 306, and the insulation material 304. Combustion of the energetic material 308 exposes the insulation material 304 to hot gases. For example, combustion of the energetic material 308 may form gases at temperatures of about 1200° C. or higher, about 1800° C. or higher, or even about 2400° C. or higher. The gases ablate a portion of the cross-linked polymeric matrix 106 and a portion of the partially cured polymer 104 forms ceramic 404 (see FIG. 5). The ceramic 404 may reflect a portion of the heat back into the interior of the casing 302, heating the energetic material 308 (thus increasing the burn rate thereof) and maintaining the casing 302 at a lower temperature than may be observed absent ceramic formation. The nozzle 350 shown in FIG. 4 may offer similar benefits, forming a ceramic over the insulation material 354 as hot gases pass through the nozzle 350, especially near the throat, where the highest flow velocity typically occurs. The ceramic may decrease the flow of thermal energy to the outer wall 352 of the nozzle 350.

Figure 6:
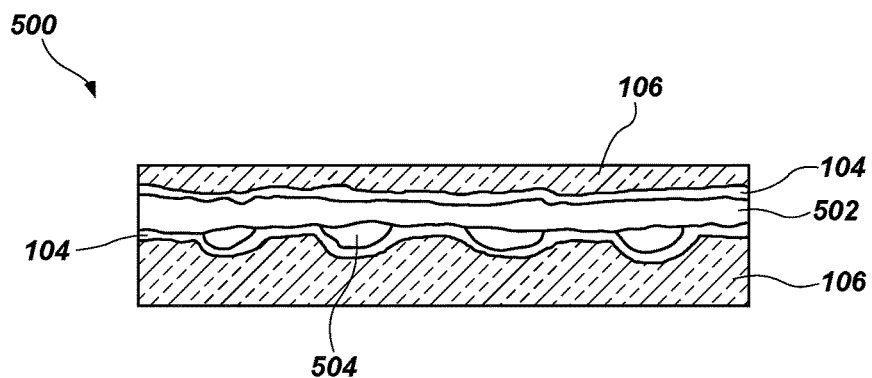
FIG. 6 shows a simplified schematic cross-section of another insulation material according to an embodiment of the present disclosure.

FIG. 6 shows a simplified illustration of an embodiment of insulation material 500. The insulation material 500 has a plurality of fibers 502 and 504 formed into cloths or sheets of material. For example, the fibers 502 and 504 may be knit or woven. The fibers 502 and 504 are coated with the partially cured polymer 104. The fibers 502 and 504 are in the cross-linked polymeric matrix 106.

Figure 7:
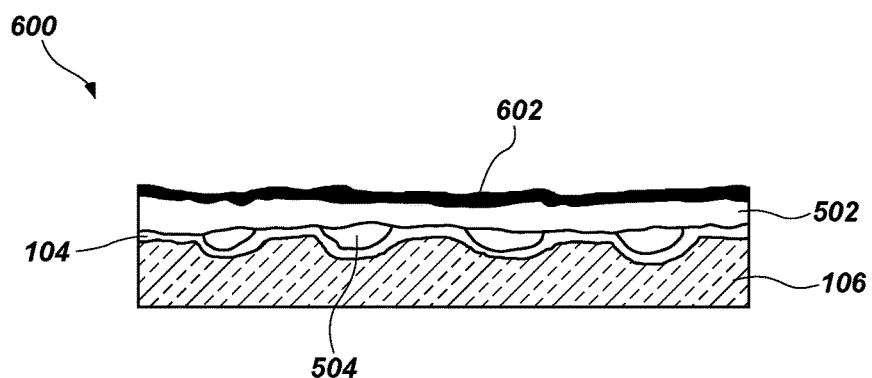
FIG. 7 shows a simplified schematic cross-section of the insulation material of FIG. 6 after exposure to a temperature of greater than about 850° C.

After the insulation material 500 has been subjected to a high temperature (e.g., greater than about 850° C.), the insulation material 600 shown in FIG. 7 may form. Upon exposure to the high temperature, a portion of the cross-linked polymeric matrix 106 is ablated. Furthermore, a portion of the partially cured polymer 104 reacts or fuses to form a ceramic 602 over or around the fibers 502 and 504. The ceramic 602 provides additional insulative properties to the insulation material 600. The ceramic 602 may form a continuous layer over the fibers 502 and 504.

The formation of the ceramic over an insulation material during a rocket motor firing may be beneficial because the ceramic may have a higher volume or thermal resistivity than the insulation material from which the ceramic forms. Formation of ceramic may also limit or prevent ablation of the insulation material by reflecting heat because the ceramic may be more reflective than the cross-linked polymeric matrix 106.

Ceramic materials in general may function well as insulators. However, insulation materials containing ceramics tend to be relatively expensive and have less robust physical properties (e.g., may be more brittle) than other insulation materials. Forming a ceramic material from a partially cured polymer during use and operation of the article (e.g., during exposure to heat, such as in a rocket motor firing) may provide the benefits of having a ceramic material in the insulation material, yet may limit or minimize problems associated with the ceramic material being present in the insulation material initially. For example, forming a ceramic during use may limit the risk that the ceramic will be damaged (e.g., cracked) during manufacturing or handling of an article. Any damage to the ceramic during use may be healed by subsequent formation of additional ceramic material. Thus, insulation materials having partially cured polymers therein may have better insulating properties than conventional materials.

By increasing the thermal performance of an insulation material, the volume of the insulation material may be reduced in comparison to conventional insulation materials, leaving a larger volume of the article available to contain energetic or other materials. All other factors being equal, the performance of a rocket motor may be increased by increasing the volume of energetic material. The volume of energetic material may be increased by replacing a portion of non-energetic insulation material with energetic material, so long as the remaining insulation material provides sufficient thermal protection.

Furthermore, by coating the fibers with preceramic polymers as described herein, the amount of partially cured polymers and ceramic material may account for a small portion of the insulation material, saving on costs and insulation weight. Since the ceramic material is present as a coating on the fibers, the ceramic material may contribute only a small amount to the overall weight to the insulation material and, thus, to the cost of the insulation material.

Because the coated fibers disclosed herein may be used in a matrix of various insulation materials, the matrix may be selected to have a long useful life (e.g., by retaining physical properties in storage conditions). Lifecycle costs may be decreased by increasing the lifetime of the insulation material, which further decreases the costs of production (e.g., of replacement components), logistics, and disposal (e.g., of old, unusable components).

The insulation materials disclosed herein may enhance safety of handling and use of energetic compositions and related components. The insulation materials disclosed herein may be used in conjunction with any energetic composition, such as solid propellants, gas generators, smokeless powders, explosives, igniters, etc. The insulation materials may provide protection from degradation of the casing or other enclosure during the use of the energetic composition, which may be valuable in protecting against catastrophic failure.

The insulation materials may be used as a drop-in replacement for conventional insulation materials in the production of rocket motors and other devices. For example, the insulation material may be used in automotive air-bag deployment systems, fire walls, fire-fighting equipment, etc. The insulation materials may be particularly useful for protecting from extremely high temperatures for short periods of time.

The following examples serve to explain embodiments of the insulation materials and methods of forming the insulation materials in more detail. These examples are not to be construed as being exhaustive or exclusive as to the scope of the disclosure.

EXAMPLES

Materials mentioned in the following Examples are available from the commercial sources indicated, including The Dow Chemical Company (Midland, Mich.), E.I. du Pont de Nemours and Company (Wilmington, Del.), Akrochem Corporation (Akron, Ohio), Vanderbilt Chemicals, LLC (Norwalk, Conn.), PPG Industries, Inc. (Monroeville, Pa.), Cabot Corporation (Boston, Mass.), Horsehead Corporation (Monaca, Pa.), and S.F. Sulfur Corporation (Freeport, Tex.). Percentages in the following examples are weight percentages based on the total composition mixture. The ingredients of these examples are also summarized in Table 2 below.

Insulation materials were tested using the Plasma Torch Test Bed (PTTB) at NASA's Marshall Space Flight Center. The PTTB includes a plasma torch (Model 7MB, available from Metco) attached to a mechanical beam or arm. For each test, a square of insulation to be tested was prepared having dimensions of about 5.1 cm by about 5.1 cm. A heat flux gauge was placed adjacent the square of insulation, and was used to calibrate the torch on each test. A water-spray fume hood in the test bay was configured to trap any noxious gases produced during the test.

The test included weighing and measuring the thickness of the insulation before placing the insulation in a sample holder. The plasma torch was directed toward the heat flux gauge to measure the heat output of the torch. The torch was then adjusted as necessary (e.g., by changing the distance from the torch to the gauge or the amount of fuel or air entering the torch) to obtain a selected flux. Once the appropriate flux was obtained, the torch was moved over the insulation sample, e.g., in the same plane as the heat flux gauge. After exposure to a selected heat flux for a selected period of time, the insulation material was cooled, the ash or ablated material was removed, and the remaining insulation material (including the char) was weighed and its thickness measured. The char was then removed, and the weight and thickness measurements were repeated. The testing method and apparatus are described in R. E. Morgan et al., "Non-Asbestos Insulation Testing Using a Plasma Torch," AIAA Paper 2000-3317 (American Institute of Aeronautics and Astronautics 2000).

A summary of the silica-filled EPDM (SFEPDM) insulation materials formed and tested in the PTTB is shown in Table 1.

TABLE 1

Insulation materials tested in Examples

| Example | Insulation type | Change in thickness (mils) | Flash observed? |
|---|---|---|---|
| 1 | SFEPDM without fibers | 1 | No |
| 1 | SFEPDM without fibers | 2 | No |
| 2 | SFEPDM with carbon fibers | −2 | No |
| 2 | SFEPDM with carbon fibers | 0 | No |
| 3 | SFEPDM with graphite fibers | 0 | No |
| 3 | SFEPDM with graphite fibers | 0 | No |
| 4 | SFEPDM with KEVLAR ® fibers | 4 | No |
| 4 | SFEPDM with KEVLAR ® fibers | 1 | No |
| 5 | SFEPDM with coated carbon fibers | −3 | No |
| 5 | SFEPDM with coated carbon fibers | 11 | Yes |
| 6 | SFEPDM with coated graphite fibers | 33 | Yes |
| 6 | SFEPDM with coated graphite fibers | −1 | No |
| 7 | SFEPDM with coated KEVLAR ® fibers | 19 | Yes |
| 7 | SFEPDM with coated KEVLAR ® fibers | 8 | Yes |

Example 1

SFEPDM Insulation Without Fibers

A sulfur-cured insulation material (silica-filled EPDM) was formed having the composition shown in Table 2.

TABLE 2

Composition of silica-filled EPDM

| Material | Trade Name | Source | Weight % |
|---|---|---|---|
| ethylene-propylene-diene terpolymer (EPDM) | NORDEL ™ IP 4640 | Dow Chem. | 33.05 |
| ethylene-propylene-diene terpolymer (EPDM) | NORDEL ™ IP 4520 | Dow Chem. | 26.44 |
| chlorosulfonated polyethylene | HYPALON ® 20 | DuPont | 6.61 |
| thermoplastic-phenolic resin-tackifier | AKROCHEM ® P-133 | Akrochem Corp. | 3.30 |

TABLE 2-continued

Composition of silica-filled EPDM

| Material | Trade Name | Source | Weight % |
|---|---|---|---|
| octylated diphenylamines | AGERITE ® STALITE ® S | Vanderbilt Chem. | 1.32 |
| amorphous silicon dioxide | HI-SIL ™ 233 | PPG Industries | 23.46 |
| carbon black | HAF Carbon Black | Cabot Corp. | 0.33 |
| zinc oxide | KADOX ® 930 | Horsehead Corp. | 2.64 |
| magnesium oxide | ELASTOMAG ® 170 | Akrochem Corp. | 0.33 |
| mercaptobenzothiazole disulfide | ALTAX ® MBTS | Vanderbilt Chem. | 0.99 |
| (1,1'(hexadithiodicarbonothioyl)bis-piperidine) | SULFADS ® | Vanderbilt Chem. | 0.20 |
| bis(dibutylcarbamodithioato-S,S') zinc | BUTYL ZIMATE ® | Vanderbilt Chem. | 0.99 |
| sulfur | Laccofine Sulfur | S.F. Sulfur Corp. | 0.33 |

The insulation material was mixed by hand, spread into a sheet approximately 3 mm thick, then cured in a press for 60 minutes at about 150° C. The cured insulation material was measured and tested in the PTTB under a heat flux of about 600 BTU/ft$^2$s (about 6,800 kJ/m$^2$s). The plume of gases directed at the insulation material in the PTTB included alumina particles at a mass concentration of about 0.03%.

The PTTB test was performed in duplicate. After the tests, the thickness of the insulation was measured, and the insulation materials were found to be 1 mil (0.001 inch or 0.025 mm) and 2 mils (0.002 inch or 0.051 mm) thicker, respectively, than before the tests. During a typical test, the thickness of insulation can increase due to swelling of insulation material and the formation of char or ceramic. The thickness can decrease due to ablation of the surface of the insulation material by the plume. The measurement of the change in thickness indicates the combined effect of these factors.

Example 2

SFEPDM Insulation with Carbon Fiber Cloth

The insulation material of Example 1 (before curing) was applied over and around a carbon-fiber fabric tape (available from Fiberglass Supply, of Burlington, Wash.). The insulation material was cured and tested in duplicate as described in Example 1.

After the tests, the thickness of the insulation was measured. One sample of the insulation materials was found to be 2 mils thinner than before the tests. No change in thickness was observed for the other sample.

Example 3

SFEPDM Insulation with Graphite Fiber Cloth

The insulation material of Example 1 (before curing) was applied over and around a graphite-fiber cloth (available from Fiberglass Supply). The insulation material was cured and tested in duplicate as described in Example 1.

After the tests, the thickness of the insulation was measured. No change in thickness was observed for either sample.

Example 4

SFEPDM Insulation with Aramid Fiber Cloth

The insulation material of Example 1 (before curing) was applied over and around an aramid-fiber (KEVLAR®) cloth (available from Fiberglass Supply). The insulation material was cured and tested in duplicate as described in Example 1.

After the tests, the thickness of the insulation was measured. The insulation materials were found to be 4 mils and 1 mil thicker, respectively, than before the tests.

Example 5

SFEPDM Insulation with Coated Carbon Fiber Cloth

A carbon-fiber fabric tape (available from Fiberglass Supply) was coated with a silicon carbide preceramic polymer (STARPCS® SMP-10, available from Starfire Systems, of Schenectady, N.Y.) by applying the silicon carbide preceramic polymer over the cloth, draining the excess preceramic polymer, and heating the cloth in an oven maintained at 150° C., less than 5 torr, and less than 10% relative humidity for 60 minutes. The heating formed the preceramic polymer into a cross-linked silicon carbide polymer coating over the cloth. The insulation material of Example 1 (before curing) was applied over and around the coated carbon-fiber cloth. The insulation material was cured and tested in duplicate as described in Example 1.

In one test, a flash was observed, in which the energy of the plasma torch was reflected from the surface of the insulation. Without being bound to any particular theory, it is believed that the flash corresponded to formation of a ceramic surface over the insulation material. After the tests, the thickness of the insulation was measured. The insulation material in the test having the flash was found to be 11 mils thicker than before the test. The insulation material in the test without a flash was found to be 3 mils thinner than before the test.

Without being bound to any particular theory, it is believed that insulation materials that did not exhibit a flash may have been deformed in the PTTB apparatus such that the heat flux was not properly focused. This may have prevented the insulation from reaching a temperature at which the ceramic material would have formed. An observed flash appears to correlate with formation of a relatively thick ceramic. Because the silicon carbide preceramic polymer forms silicon carbide at temperatures above about 850° C., exposure of the insulation materials having coated fibers to temperatures below 850° C. should not cause the formation of ceramic material.

Example 6

SFEPDM Insulation with Coated Graphite Fibers

A graphite fiber cloth (available from Fiberglass Supply) was coated with a silicon carbide preceramic polymer (STARPCS® SMP-10) by applying the silicon carbide preceramic polymer over the cloth, draining the excess preceramic polymer, and heating the cloth in an oven maintained at 150° C., atmospheric pressure, and less than 10% relative humidity for 60 minutes. The heating formed the preceramic polymer into a cross-linked silicon carbide polymer coating over the cloth. The insulation material of Example 1 (before curing) was applied over and around the coated graphite-fiber cloth. The insulation material was cured and tested in duplicate as described in Example 1.

In one test, a flash was observed, in which the energy of the plasma torch was reflected from the surface of the insulation. After the tests, the thickness of the insulation was measured. The insulation material in the test having the flash was found to be 33 mils thicker than before the test. The insulation material in the test without a flash was found to be 1 mil thinner than before the test.

Without being bound to any particular theory, it is believed that insulation materials that did not exhibit a flash may have been deformed in the PTTB apparatus such that the heat flux was not properly focused. This may have prevented the insulation from reaching a temperature at which the ceramic material would have formed. An observed flash appears to correlate with formation of a relatively thick ceramic. Because the silicon carbide preceramic polymer forms silicon carbide at temperatures above about 850° C., exposure of the insulation materials having coated fibers to temperatures below 850° C. should not cause the formation of ceramic material.

Example 7

SFEPDM Insulation with Coated Aramid Fibers

An aramid-fiber (KEVLAR®) cloth (available from Fiberglass Supply) was coated with a silicon carbide preceramic polymer (STARPCS® SMP-10) by applying the silicon carbide preceramic polymer over the cloth, draining the excess preceramic polymer, and heating the cloth in an oven maintained at 150° C., atmospheric pressure, and less than 10% relative humidity for 60 minutes. The heating formed the preceramic polymer into a cross-linked silicon carbide polymer coating over the cloth. The insulation material of Example 1 (before curing) was applied over and around the coated aramid-fiber cloth. The insulation material was cured and tested in duplicate as described in Example 1.

In both tests, a flash was observed, in which the energy of the plasma torch was reflected from the surface of the insulation. The insulation materials were found to be 19 mils and 8 mils thicker, respectively, than before the tests.

Prophetic Example 8

EPDM Insulation with Coated Aramid Fibers

An aramid-fiber is coated with a silicon carbide preceramic polymer (STARPCS® SMP-10) by applying the silicon carbide preceramic polymer over the cloth, draining the excess preceramic polymer, and heating the cloth in an oven maintained at 150° C., atmospheric pressure, and less than 10% relative humidity for 60 minutes. The heating forms the preceramic polymer into a cross-linked silicon carbide polymer coating over the cloth. A sulfur-cured insulation material (EPDM) is formed having the composition shown in Table 3. The composition shown in Table 3 is similar to the composition shown in Table 2, above, but without the amorphous silicon dioxide. Alternatively, the EPDM insulation may be formed with another filler material.

TABLE 3

Composition of EPDM

| Material | Trade Name | Source | Weight % |
|---|---|---|---|
| ethylene-propylene-diene terpolymer (EPDM) | NORDEL ™ IP 4640 | Dow Chem. | 43.19 |
| ethylene-propylene-diene terpolymer (EPDM) | NORDEL ™ IP 4520 | Dow Chem. | 34.54 |
| chlorosulfonated polyethylene | HYPALON ® 20 | DuPont | 8.64 |
| thermoplastic-phenolic resin-tackifier | AKROCHEM ® P-133 | Akrochem Corp. | 4.31 |
| octylated diphenylamines | AGERITE ® STALITE ® S | Vanderbilt Chem. | 1.72 |
| carbon black | HAF Carbon Black | Cabot Corp. | 0.43 |
| zinc oxide | KADOX ® 930 | Horsehead Corp. | 3.45 |
| magnesium oxide | ELASTOMAG ® 170 | Akrochem Corp. | 0.43 |
| mercaptobenzothiazole disulfide | ALTAX ® MBTS | Vanderbilt Chem. | 1.29 |
| (1,1'(hexadithiodicarbonothioyl)bis-piperidine) | SULFADS ® | Vanderbilt Chem. | 0.26 |
| bis(dibutylcarbamodithioato-S,S') zinc | BUTYL ZIMATE ® | Vanderbilt Chem. | 1.29 |
| sulfur | Laccofine Sulfur | S.F. Sulfur Corp. | 0.43 |

The sulfur-cured insulation material is applied over and around the coated aramid-fiber cloth.

Prophetic Example 9

NBR Insulation with Coated Aramid Fibers

An aramid-fiber (KEVLAR®) cloth is coated with a polysilazane silicon carbide preceramic polymer by applying the silicon carbide preceramic polymer over the cloth, draining the excess preceramic polymer, and heating the cloth in an oven maintained at 150° C., atmospheric pressure, and less than 10% relative humidity for 60 minutes. The heating forms the preceramic polymer into a cross-linked silicon-nitrogen coating over the cloth. A nitrile butadiene rubber (NBR) is formed having copolymers of acrylonitrile and butadiene, such as NIPOL® 1042, NIPOL® 1052, NIPOL® 1052-30, NIPOL® 1312, or combinations thereof, commercially available from Zeon Chemicals (Louisville, Ky.). The NBR is applied over and around the coated aramid-fiber cloth.

While the present disclosure is susceptible to various modifications and alternative forms, specific embodiments have been shown by way of example in the drawings and have been described in detail herein. However, the present disclosure is not intended to be limited to the particular forms disclosed. Rather, the present disclosure is to cover all modifications, equivalents, and alternatives falling within the scope of the present invention as defined by the following appended claims and their legal equivalents.

What is claimed is:

1. An insulation material, comprising:
   a heat-affected region comprising fibers with a ceramic thereon; and
   a virgin material region comprising the fibers comprising a partially cured preceramic polymer coating thereon and disposed in a cross-linked polymeric matrix, wherein a preceramic polymer of the partially cured preceramic polymer coating comprises a material selected from the group consisting of a polycarbosilane, a polysilazane, a polysiloxane, and combinations thereof.

2. The insulation material of claim 1, wherein the heat-affected region comprises the ceramic over the fibers.

3. The insulation material of claim 1, wherein the heat-affected region comprises the ceramic around the fibers.

4. The insulation material of claim 1, wherein the heat-affected region comprises an ablated region and a char region.

5. The insulation material of claim 4, wherein a portion of the char region is adhered to the virgin material region.

6. The insulation material of claim 1, wherein the heat-affected region comprises ash.

7. The insulation material of claim 1, wherein the ceramic comprises silicon dioxide, silicon carbide, or a combination thereof.

8. The insulation material of claim 1, wherein the ceramic exhibits a higher thermal reflectivity than the cross-linked polymeric matrix or the partially cured preceramic polymer coating.

9. The insulation material of claim 1, wherein the ceramic of the heat-affected region comprises a sintered matrix of the partially cured preceramic polymer coating.

10. The insulation material of claim 1, wherein the fibers comprise at least one of carbon fibers, graphite fibers, or aramid fibers.

11. An insulation material, comprising:
    a ceramic over fibers, a portion of the fibers comprising a partially cured preceramic polymer coating thereover and disposed in a cross-linked polymeric matrix and another portion of the fibers comprising the ceramic thereover, a preceramic polymer of the partially cured preceramic polymer coating comprising a material selected from the group consisting of a polycarbosilane, a polysilazane, a polysiloxane, and combinations thereof.

12. The insulation material of claim 11, wherein the fibers are configured as at least one of a sheet or a cloth.

13. The insulation material of claim 11, wherein the ceramic is directly over the another portion of the fibers.

14. The insulation material of claim 11, wherein the ceramic is a continuous layer over the another portion of the fibers.

15. A structure, comprising:
    an insulation material over at least one surface of at least one component of a structure, the insulation material comprising:
    a heat-affected region comprising fibers with a ceramic thereon; and
    a virgin material region comprising fibers comprising a partially cured preceramic polymer coating thereon and disposed in a cross-linked polymeric matrix, wherein a preceramic polymer of the partially cured preceramic polymer coating comprises a material selected from the group consisting of a polycarbosilane, a polysilazane, a polysiloxane, and combinations thereof.

16. The structure of claim 15, wherein the structure comprises a gas generating device, ordnance, munitions, or a rocket motor.

17. A method of insulating a structure, the method comprising:
    applying an insulation material to a surface of at least one component of a structure, the insulation material comprising fibers comprising a partially cured preceramic polymer coating thereon and disposed in a cross-linked polymeric matrix, a preceramic polymer of the partially cured preceramic polymer coating comprising a material selected from the group consisting of a polycarbosilane, a polysilazane, a polysiloxane, and combinations thereof; and
    curing the insulation material to form a ceramic on at least a portion of the fibers and to ablate a portion of the cross-linked polymeric matrix, wherein curing the insulation material comprises forming a heat-affected region of the insulation material and a virgin material region of the insulation material, the heat-affected region comprising the fibers with the ceramic thereon.

18. The method of claim 17, wherein curing the insulation material comprises exposing the insulation material to a temperature of at least about 850° C.

19. The method of claim 17, wherein curing the insulation material comprises exposing the insulation material to a temperature of at least about 1200° C.

20. The method of claim 17, wherein forming a heat-affected region of the insulation material and a virgin material region of the insulation material comprises forming a char region of the heat-affected region adhered to the virgin material region.

21. The method of claim 17, wherein forming a heat-affected region of the insulation material and a virgin material region of the insulation material comprises removing a portion of the cross-linked polymeric matrix in the heat-affected region and forming the ceramic on at least a portion of the fibers in the heat-affected region.

22. The method of claim 17, wherein curing the insulation material to form a ceramic comprises removing carbon from the partially cured preceramic polymer coating.

* * * * *